(12) United States Patent
Klaves

(10) Patent No.: US 9,186,824 B2
(45) Date of Patent: Nov. 17, 2015

(54) SNOWMAN MAKING DEVICE

(71) Applicant: Anthony Klaves, Granite Bay, CA (US)

(72) Inventor: Anthony Klaves, Granite Bay, CA (US)

(*) Notice: Subject to any disclaimer, the term of this patent is extended or adjusted under 35 U.S.C. 154(b) by 257 days.

(21) Appl. No.: 13/872,535

(22) Filed: Apr. 29, 2013

(65) Prior Publication Data

US 2013/0307180 A1 Nov. 21, 2013

Related U.S. Application Data

(63) Continuation-in-part of application No. 13/419,119, filed on Mar. 13, 2012, now abandoned.

(51) Int. Cl.
*B29C 41/00* (2006.01)
*A63H 33/00* (2006.01)

(52) U.S. Cl.
CPC ............ *B29C 41/003* (2013.01); *A63H 33/001* (2013.01); *Y10T 29/49002* (2015.01); *Y10T 29/49947* (2015.01)

(58) Field of Classification Search
CPC .......... B29C 41/00; B29C 41/02; B29C 41/38
See application file for complete search history.

(56) References Cited

U.S. PATENT DOCUMENTS

| | | | |
|---|---|---|---|
| 3,059,279 A | 10/1962 | Rossi | |
| 3,572,625 A | 3/1971 | Williamsen | |
| 3,836,308 A * | 9/1974 | Upright | A63H 33/001 220/4.21 |
| 3,848,846 A | 11/1974 | Ebner | |
| 4,164,341 A | 8/1979 | McComb | |
| 4,725,036 A | 2/1988 | Brandon et al. | |
| 5,380,237 A | 1/1995 | Kenyon | |
| D375,964 S | 11/1996 | Poubouridis | |
| 5,632,926 A | 5/1997 | Dyer, Jr. | |
| D384,960 S | 10/1997 | Kistler | |
| 5,788,873 A | 8/1998 | Warsaw | |
| 5,851,415 A | 12/1998 | Thomas | |
| D435,069 S | 12/2000 | Berardelli | |
| 6,176,464 B1 | 1/2001 | Harvey | |
| 7,000,887 B1 | 2/2006 | Mulhern | |
| D535,348 S | 1/2007 | Sammann | |
| 7,264,531 B2 | 9/2007 | Asperas | |
| 7,604,391 B2 | 10/2009 | Cheng | |
| 7,661,838 B2 | 2/2010 | Chen | |
| 7,963,500 B1 | 6/2011 | Holiday | |
| 2010/0068967 A1* | 3/2010 | Hume | A63F 9/0873 446/69 |

OTHER PUBLICATIONS

Kiselev, et al., Snowman Construction Thyeory.
Eckstein, The History of the Snowman.

* cited by examiner

*Primary Examiner* — James Sanders

(57) ABSTRACT

A snowman making device includes hollow spheres each having a hollow outer sphere and a hollow inner sphere. The outer sphere is penetrated by a plurality of first openings. The inner sphere is located within the outer sphere and spaced from the outer sphere by a first distance. The spheres collect snow between the outer sphere and the inner sphere and upon an outer surface of the outer sphere as the hollow spheres are rolled in snow, thereby forming light weight snow spheres useful as body parts of a snowman. The inner sphere is penetrated by a plurality of second openings that permit the entry of snow into an interior of the inner sphere, thereby preventing movement of snow located between the outer sphere and the inner sphere. The inner and outer spheres are each formed as first and second joinable hemispheres. Accessory decorations can be attached to the spheres.

8 Claims, 5 Drawing Sheets

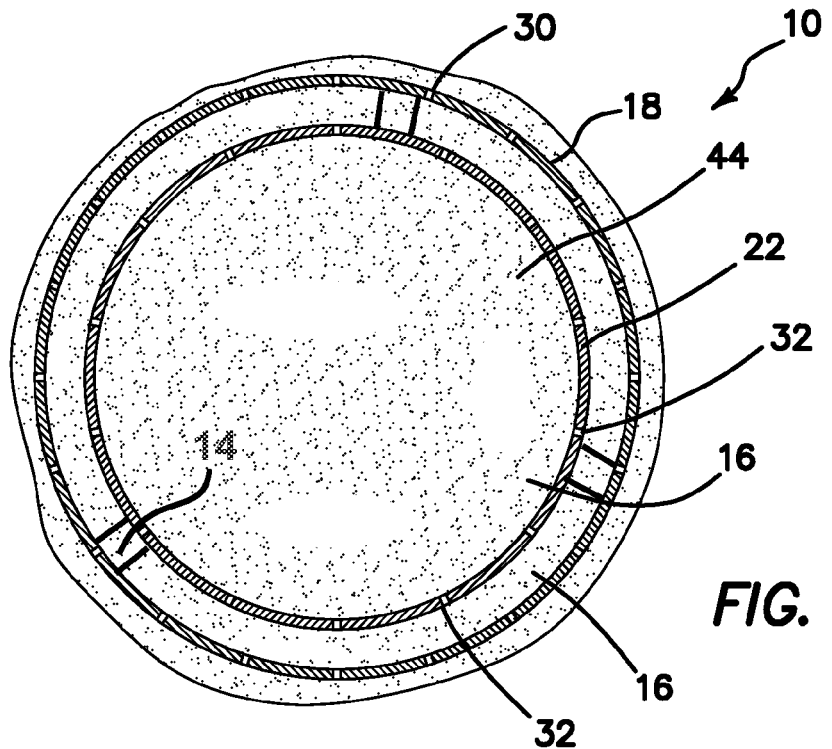
FIG. 3
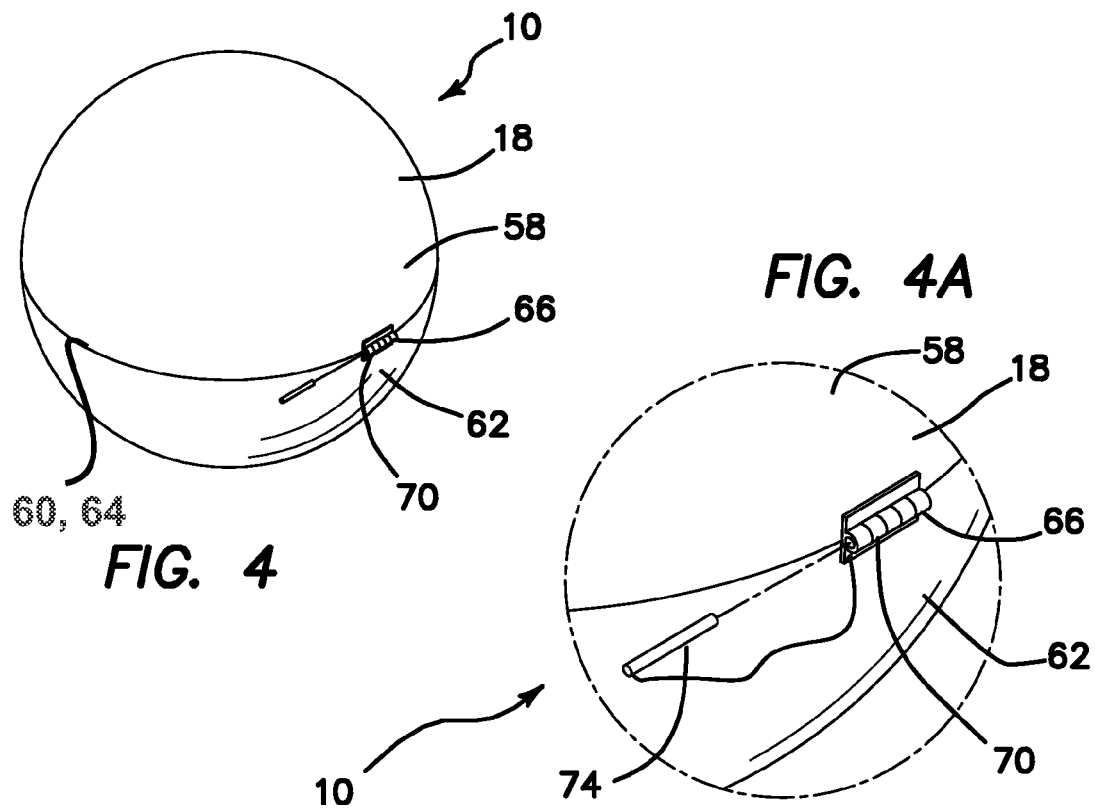
FIG. 4
FIG. 4A

SNOWMAN MAKING DEVICE

CROSS REFERENCE TO RELATED APPLICATIONS

This Application is a Continuation in Part of U.S. patent application Ser. No. 13/419,119, filed Mar. 13, 2012. The entire specification, claims and drawings of U.S. patent application Ser. No. 13/419,119 are hereby incorporated herein by reference.

FIELD OF INVENTION

This invention relates to the field of winter recreation and more specifically to devices and methods for the construction of snowmen and similar snow constructions.

BACKGROUND OF THE INVENTION

Typical construction techniques for the making of snowman involve the forming of large, spherical masses of snow. These snow spheres are used to form the lower and middle parts of the snowman body with a smaller sphere formed for the head. To build a snowman of roughly human size takes considerable time and requires the lifting of at least one fairly heavy sphere on to the upper surface of a base sphere. Such an effort may be to strenuous for the small children usually interested in snowmen, thus requiring adult assistance. The present invention addresses this problem and also provides additional benefits.

U.S. Pat. No. 7,264,531, issued to Asperas, discloses a building component for facilitating the construction of snow boulders that can be used for making snow men or women. The construction component is snow spheres with an adhesive surface that can be provided as a single piece or constructed from components like hemispheres that can be assembled to form a sphere. The adhesive surface can have holes, nodules, bumpers, impressions or dimples that grip and hold snow as the sphere is being rolled on a snow surface. The resulting boulder that is formed by rolling the sphere in the snow is lighter than a solid snow boulder and it lasts longer as the weather warms. The spheres may be made out of plastic, graphite or other composite, fiberglass, aluminum or any other metal. An alternate embodiment is a blow-up beach ball or balloon that provides for easier stocking, shipping and storing when not in use. The boulder applies snow clumps to the adhesive surface and then rolls the snow sphere to create a large snow boulder that is lighter in weight than the normal snow boulder. A snow sphere with adhesion surface can be made of lightweight material but can have support and strength supplied by Styrofoam, graphite or other lightweight materials. The lightweight materials may either fill the interior or be arranged to leave spaces such as in a baffled, corrugated, or matrix arrangement.

U.S. Pat. No. 7,000,887, issued to Mulhern is directed to a snow sphere for making various objects out of snow and particularly for forming into the appearance of a typical snowman. The snow sphere is comprised of an elongate flat sheet of flexible material having slots cut out along its length and tabs cut out or affixed at one end. The flat sheet is preferably easily rolled up and stored when not in use. It can be made of plastics such as vinyl, polyethylene, and natural rubber as well as synthetic elastomers. In use the tabs are engaged into a selected group of slots forming the desired diameter. Snow is shoveled or otherwise placed into the snow sphere. Once filled, the sphere can be released by simply pulling out the tabs from the slots. For the typical snowman, three diameters are constructed with the largest at the base and the smallest at the top for the head.

U.S. Pat. No. D384,960, issued to Kistler illustrates an ornamental design for a snow sphere. The design is shown as three circular spheres with the largest used for the base, the smallest for the head and the middle for the upper body. The spheres are barrel shaped and split in two with the two halves possibly hinged together and held closed by a pair of latches. The center sphere is shown with three short cylindrical members fastened to the inside wall of the sphere apparently providing a place for buttons to be installed after the sphere is removed.

U.S. Pat. No. D375,964, issued to Poubouridis discloses an ornamental design for a snowman sphere. The design is shown as three separate spheres that can be set one on top of the other. Each sphere is split into two halves and hinged together with a means to keep the halves together and aligned when closed. The first sphere base is the largest and the smallest is for the head.

U.S. Pat. No. 3,059,279, issued to Rossi is directed to a multi-sectional interlocked snow sphere. The sphere includes a bottom section, intermediate section and a top section. The three spheres are in the form of a truncated spheroid with the two smaller ones having sections provided with a downwardly depending annular stud flange adapted to engage the top opening of the section below it. Each sphere is subdivided along vertical joints into halves that are hemispheroidal. The halves are provided with a suitable vertical edge-to-edge inter-engaging means which are rapidly attached or detached from each other. Opposite the edge-to-edge inter-engaging means are snap fasteners. The sphere sections can be made with sheet metal but preferably they are made from a synthetic plastic material as by sphering or forming from sheets.

U.S. Pat. No. 7,661,838, issued to Chen discloses decorative lighting for outdoors that can include a cover shown as a snowman's head that is illuminated by placing it over the top of a pole that has one or more LEDs.

U.S. Pat. No. 7,604,391, issued to Cheng is directed to an outdoor decorative light system that includes a plurality of bulb assemblies and attendant wiring and a support member. Typically the decorative light system can provide decoration for gifts, candy canes, Santa Claus, snowman, reindeer, Christmas trees, north pole, elf, manger, cross, ornament, sled, holly, bells, stockings, star, candles, sack of gifts, wreath, mistletoe, and the like.

U.S. Pat. No. 3,822,106 to Bonet Sirera describes an apparatus for sphering tubular members of fibrous cement, which comprises a two part sphere including a foraminous casing and an expansible core structure; means rotatably supporting at least one of said sphere parts, and means for expanding and contracting said core to compress and express moisture from the cement and then release the compressed cement, said core structure including a flexible sleeve surrounding a foraminous core having longitudinal external ribs.

United States Patent Application Publication 20110277310 to Washburn describes a simple and easy to make snowman with a limited amount of snow. The system does not require the lifting of heavy snow balls, typically used in the making of a snowman, and provides for small children to be able to handle the snow without adult help. Further, this invention provides a quick and affective decorating system which can be reused and positioned securely anywhere on the figure.

United States Patent Application Publication 20100068967 to Hume describes an apparatus including at least three 3-dimensional shapes, a first one of the 3-dimensional shapes being rotatably supported within a second one of the 3-dimensional shapes, the second one of the 3-dimensional shapes being rotatably supported within a third one of the 3-dimensional shapes, at least one of the 3-dimensional shapes including an opening capable of connecting at least one of the shapes to another one of the shapes.

United States Patent Application Publication 20080094839 to Pan describes a patterned ornament having lighting figures, which includes a transparent shell and inner lighting means. The inner surface of the ornament is provided with specific inclined or curved planes to reflect light ray to form specific virtual image shown on the ornament. The patterned ornament thus obtains beautiful outlook and increases decorative effect.

It is an objective of the present invention to provide a snowman making device and method that will allow large snowmen to be constructed quickly and easily. It is a further objective to provide such a device that will provide a snowman of traditional appearance that is light in weight and easily movable. It is a still further objective of the invention to provide a snowman making device and method of construction that can be safely and easily used by young children. It is yet a further objective to provide such a device that can be easily cleaned, maintained and stored. Finally, it is an objective of the present invention to provide a snowman making device that is durable, inexpensive and simple to use.

While some of the objectives of the present invention are disclosed in the prior art, none of the inventions found include all of the requirements identified. Development of a snow man making device which can be assembled quickly and easily without requiring great height or strength represents a great improvement in the field of recreation and satisfies a long felt need of parents and children.

SUMMARY OF THE INVENTION

The present invention addresses all of the deficiencies of prior art snowman making device inventions and satisfies all of the objectives described above.

A snowman making device providing the desired features may be constructed from the following components. A plurality of hollow spheres is provided. Each of the spheres has an outer sphere and an inner sphere, and may be formed of resilient material. The outer and inner spheres are penetrated by a number of openings. The inner sphere is fixed inside the outer sphere and spaced from the outer sphere by a distance. When rolled in snow, snow penetrates through the openings and collects between the outer sphere and the inner sphere, inside the inner sphere and upon an outer surface of the outer sphere. The snow on the outer surface will be kept in place by virtue of its penetration of the openings. Since the snow will not be packed tightly within the sphere, a light weight snow sphere is formed. If three sizes of spheres are provided, the resulting snow spheres can be stacked upon each other to make a snowman.

In a variant of the invention, the inner and outer spheres are each formed as first and second joinable hemispheres.

In a further variant, the joinable first and second hemispheres are attached to each other with a latching mechanism.

In still another variant, the latching mechanism includes at least one hinge which has a removable pin.

In yet another variant, the latching mechanism includes at least one pair of male and matching female snap connectors.

In a further variant, the inner sphere is removably attached to the outer sphere, thereby allowing stacking of the hemispheres.

In yet a further variant, at least one section of the outer surface of the outer sphere is flattened to assist in stacking of the snow spheres.

In still a further variant, at least one part of the outer surface of the outer sphere includes a connector. The connector permits attachment of a first outer sphere to a second outer sphere.

In another variant of the invention, electric lighting is mounted within at least one of the spheres.

In still another variant, at least one mounting device is provided. The mounting device is located upon the outer surface of the outer sphere and permits attachment of an accessory to the outer sphere.

In yet another variant, the accessory is selected from the group that includes at least arms, facial features, hats, clothing and pipes.

In a further variant, the first predetermined distances ranges from ½" to 3".

In yet a further variant, the first and second openings range in size from ½" to 1".

In still a further variant, the first and second openings are formed as a series of slits. The slits have a length at least twice as long as a width of the slit.

In a final variant, the first and second openings are formed as a series of shapes chosen from the group includes at least X-shapes, polygons, alphabetic characters, numbers, symbols, animal shapes, leaf shapes and fanciful characters.

An appreciation of the other aims and objectives of the present invention and an understanding of it may be achieved by referring to the accompanying drawings and the detailed description of a preferred embodiment.

DESCRIPTION OF THE DRAWINGS

FIG. 3 is a cross sectional view of one of the hollow spheres of this invention illustrating an outer sphere and an inner sphere, each having a series of penetrating openings and with snow on the outer surface and snow filling most of the space between the spheres;

FIG. 4 is a perspective view of one of the hollow spheres of this invention illustrating a hinge with removable pin for fastening the hemisphere together;

FIG. 4A is a close-up partial perspective view of one of the spheres of the FIG. 4 embodiment illustrating a hinge with removable pin and retaining cord for the hinge pin;

DETAILED DESCRIPTION OF THE PREFERRED EMBODIMENT

Figure 1:
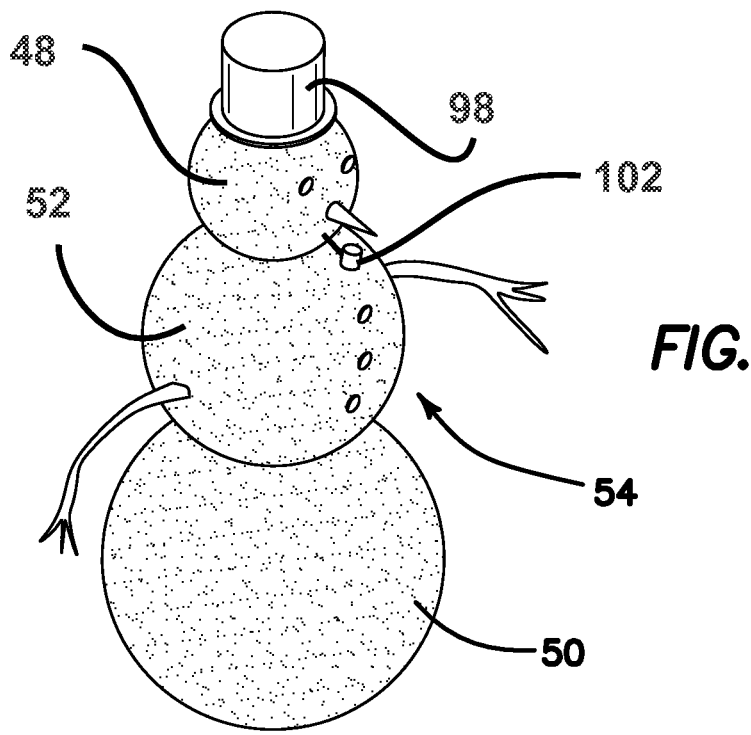
FIG. 1 is a perspective view of a completed snowman constructed using the preferred embodiment of the present invention.
Figure 2:
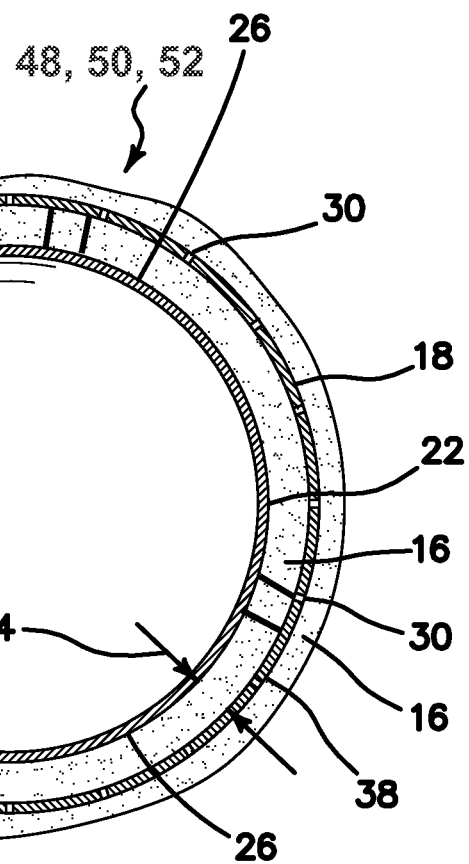
FIG. 2 is a cross sectional view of one of the hollow spheres of this invention illustrating an outer sphere having a series of penetrating openings and an inner sphere without openings with snow on the outer surface and snow filling most of the space between the spheres.

FIG. 1 shows the snowman 54 that is fabricated with this invention 10. In typical fashion the snowman has three parts: a head 48, a body 52 and a base or lower part 50. This invention 10 is provided in three sizes so that each part 48, 50, 52 can be easily made, and assembled in proper order. The three sizes are all identically fabricated. As illustrated in FIG. 2, each part 48, 50, 52 comprises two hollow spheres 18, 22. One is larger than the other so each part 48, 50, 52 comprises an outer sphere 18 and an inner sphere 22. Preferably the spheres 18, 22 are formed of some resilient material such as plastic but, as will be seen, they do not have to be transparent.

The outer sphere 18 is penetrated by a series of first openings 30. As illustrated in FIG. 3, the inner sphere 22 is penetrated by a series of second openings 32. The inner sphere 22 is located within the outer sphere 18 and fixedly spaced from the outer sphere 18 by a distance 34. This is accomplished with a number of spacers 14 attached to the inner 22 and outer spheres 18 and between them. These may be tubes or solid rods and permanently or removably attached.

As the invention 10 is rolled in the snow, snow 16 is forced through the openings 30, 32 and thereby collects between the outer sphere 18 and the inner sphere 22, and inside 44 of the inner sphere 22. Snow 16 also collects upon the outer surface 38 of the outer sphere 18 where it will be kept in place by virtue of compaction and its penetration of the openings 30. However, the invention 10 will not be completely filled with snow 16. Thus a light-weight sphere of snow in three sizes 48, 50, 52 is formed. Since three sizes of the sphere 48, 50, 52 are provided, three sizes of snow sphere 48, 50, 52 are formed which can be stacked one on top of the other to form the structure shown in FIG. 1.

In another variant of the invention, as illustrated in FIGS. 4, 4A, 5 and 5A, the inner 22 and outer 18 spheres are each formed as first 58 and second 62 joinable hemispheres, which are joined around their equators 60, 64.

In a further variant, the joinable first 58 and second 62 hemispheres are attached to each other with a latching mechanism 66.

In still another variant, as illustrated in FIGS. 4 and 4A, the latching mechanism 66 includes at least one hinge 70, which has a removable pin 74.

Figure 5:
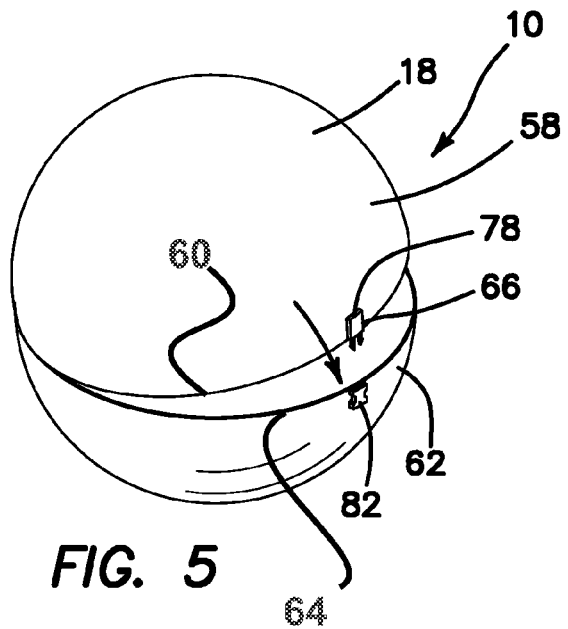
FIG. 5 is a perspective view of one of the spheres of this invention illustrating a two part clip for fastening the hemispheres together.
Figure 5A:
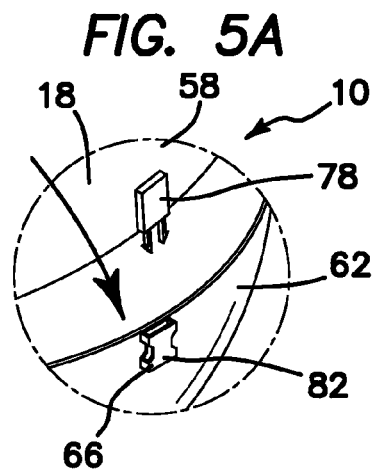
FIG. 5A is a close-up partial perspective view of one of the spheres of the FIG. 5 embodiment illustrating the closure of the two part clip.

In yet another variant, as illustrated in FIGS. 5 and 5A, the latching mechanism 66 includes at least one pair of male 78 and matching female 82 snap connectors.

Figure 6:
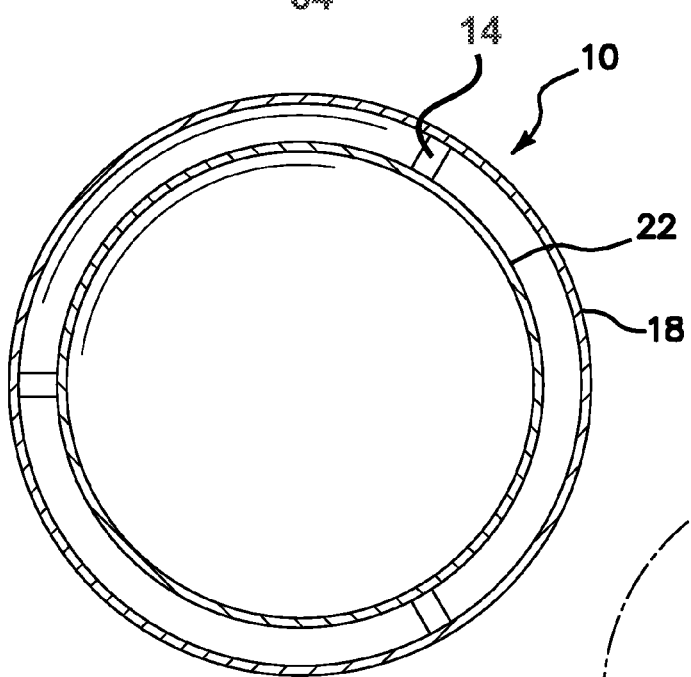
FIG. 6 is a cross-sectional view plan view of one of the hollow spheres of this invention illustrating an outer sphere and an inner sphere separated by a series of spacers.
Figure 6A:
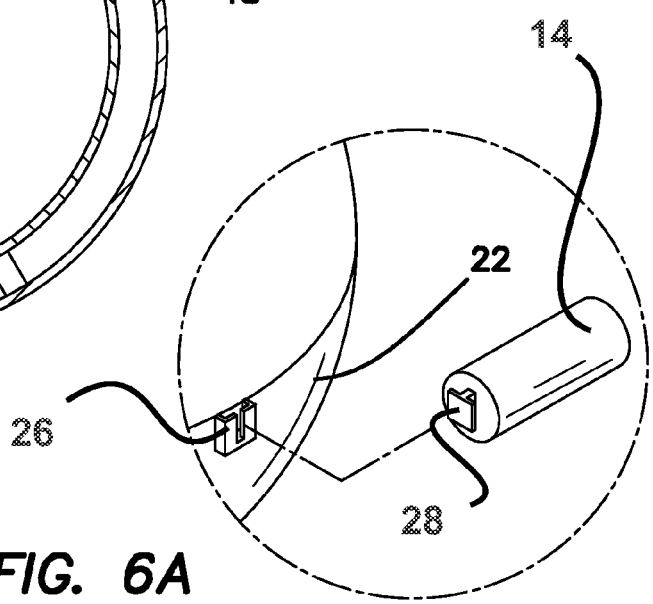
FIG. 6A is a perspective view of one of the spacers and a portion of one of the inner spheres illustrating a device for temporary attachment of the spacer to the sphere.
Figure 7:
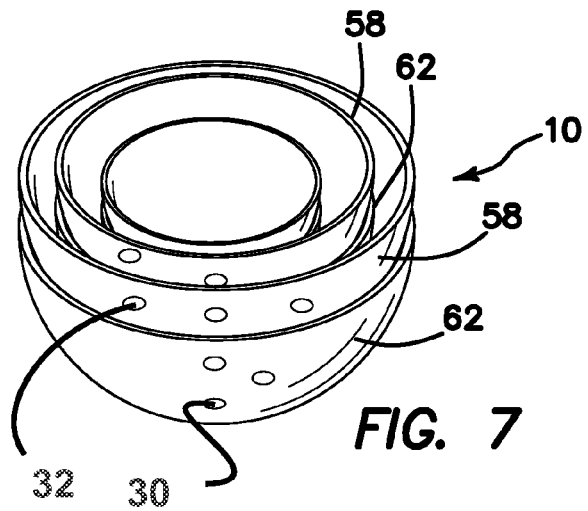
FIG. 7 is a perspective view of the spheres of this invention in disassembled and stacked form for storage.

In a further variant, as illustrated in FIGS. 6, 6A and 7, the spacers 14 are not permanently attached to either the inner 22 or outer 18 spheres but are removable. For example, a slot 26 can be attached to the inner sphere 22 and a mating tang 28 can be attached to one end of the spacer 14. But those familiar with the art to which this invention pertains will recognize that other devices and methods of attachment can be used. In this way the entire invention 10 can be disassembled and the hemispheres 58, 62 can be stacked as shown in FIG. 7 for transportation or storage.

Figure 8:
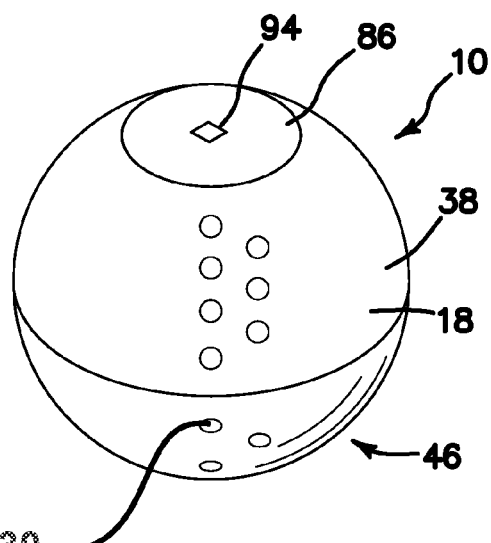
FIG. 8 is a perspective view of one of the spheres of this invention illustrating a flattened top for ease of stacking of the snow spheres.

In yet a further variant, as illustrated in FIG. 8, at least one section 86 of the outer surface 38 of the outer sphere 18 is flattened to assist in stacking of the snow spheres 48, 50, 52. Preferably the flat section 86 is at a pole of the sphere 10.

In still a further variant, also illustrated on FIG. 8, a connector 94 is located on the outer surface 38 of the outer sphere 18. Preferably it is located at one or both poles of the outer sphere 18 of each sphere 10. The connector 94 permits attachment of the outer spheres 18 of different size snow spheres 48, 50, 52 to each other. This makes it easier to stack the different sizes of snow spheres 48, 50, 52 as shown in FIG. 1.

Figure 11:
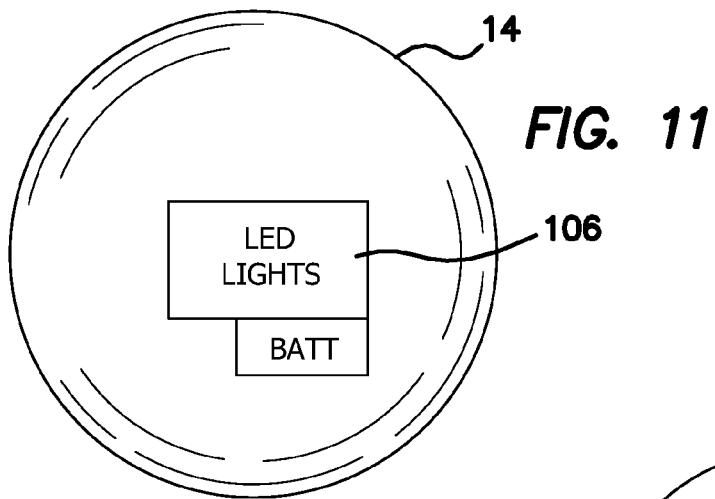
FIG. 11 is schematic view of apparatus for illuminating one of the spheres of this invention from the inside.

In another variant of the invention, as illustrated in FIG. 11, electric lighting 106 can be mounted within the invention, either between the spheres 18, 22 or inside 44 the inner sphere 22.

Figure 9:
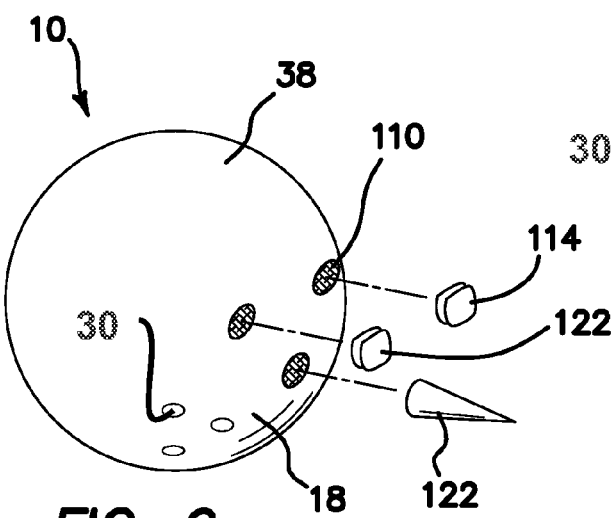
FIG. 9 is a perspective view of apparatus for attaching facial features to one of the spheres of this invention.
Figure 10:
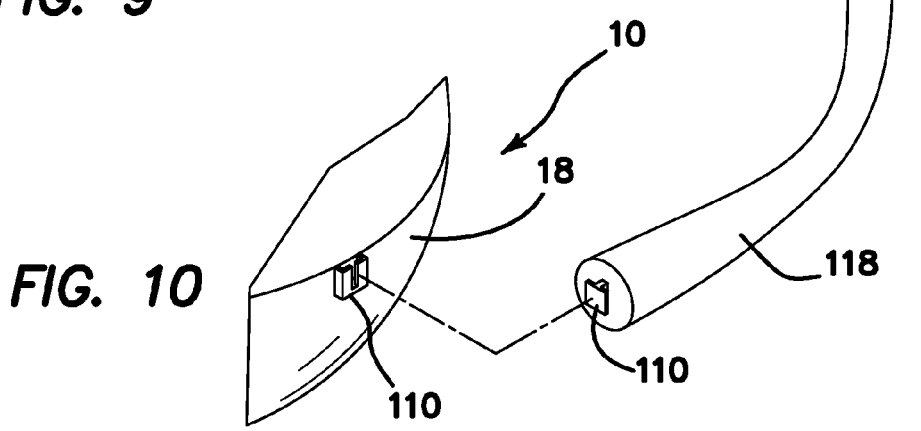
FIG. 10 is a perspective view of apparatus for attaching arms to one of the spheres of this invention.

In still another variant, as illustrated in FIGS. 9 and 10, at least one mounting device 110 is provided. The mounting device 110 is located upon the outer surface 38 of the outer sphere 18 and permits attachment of an accessory 114 to the outer sphere 18.

In yet another variant, the accessory 114 is selected from the group that includes at least arms 118, facial features 122, hats 98, clothing (not shown) and pipes 102.

In a further variant, as illustrated in FIG. 2, the first predetermined distance 34 ranges from ½" to 3".

In yet a further variant, as illustrated in FIGS. 2 and 3, the first 30 and second 32 openings range in size from ¼" to 1".

Figure 12:
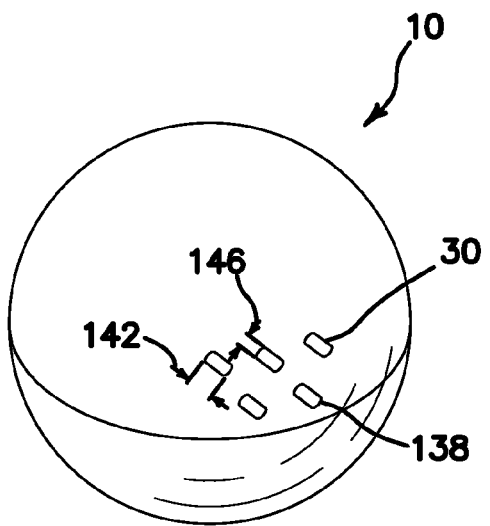
FIG. 12 is a perspective view of one of the spheres of this invention illustrating ovoid openings in the outer sphere.

In still a further variant, as illustrated in FIG. 12, the first 30 and second openings 32 slits 138. The slits 138 may a length 142 at least twice as great as their widths 146.

Figure 13:
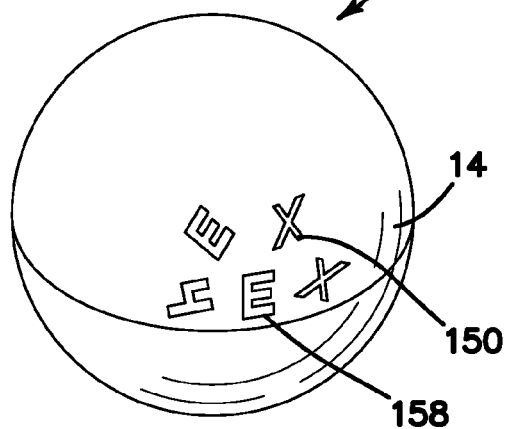
FIG. 13 is a perspective view of one of the spheres of this invention illustrating alphabetical openings in the outer sphere.
Figure 14:
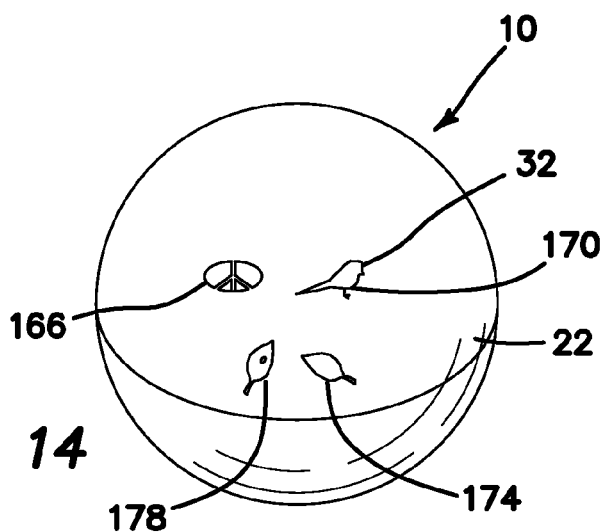
FIG. 14 is a perspective view of one of the spheres of this invention illustrating symbolic figure openings in the outer sphere.

In a final variant, as illustrated in FIGS. 13 and 14, the first 30 and second 32 openings are shapes including X-shapes 150, polygons (not shown), alphabetic characters 158, numbers (not shown), symbols 166, animal shapes 170, leaf shapes 174 and fanciful characters 178.

The following reference numbers are used on the Figures:
10 this invention
14 spacer
18 outer sphere
22 inner sphere
26 slot
28 tang
30 first openings
32 second openings
34 first predetermined distance
38 outer surface of outer sphere
44 interior of the inner sphere
48 head
50 lower part
52 a body
54 snowman
58 first joinable hemisphere
60 equator of first hemisphere
62 second joinable hemisphere
64 equator of second hemisphere
66 latching mechanism
70 hinge of latching mechanism
74 removable pin
78 male snap connector 82 female snap connector
86 flat section of outer surface of outer sphere
90 part of outer surface of outer sphere
94 connector
98 hat
102 pipe
106 electric lighting
110 mounting device
114 accessory
118 arm
122 facial feature
132 slit
150 X-shape
158 alphabetic character
166 symbol
170 animal shape
174 leaf shape
178 fanciful character The snowman making device 10 has been described with reference to particular embodiments. Other modifications and enhancements can be made without departing from the spirit and scope of the claims that follow.

The invention claimed is:

1. A device for making a light-weight sphere of snow comprising:
   a) a hollow outer sphere; said outer sphere penetrated by a plurality of first openings; said outer sphere further comprising two outer hemispheres joined to each other at their equators; and
   b) a hollow inner sphere said inner sphere being fixedly disposed within said outer sphere, spaced from said outer sphere by a distance and penetrated by a plurality of second openings that permit the entry of snow into an interior of the inner sphere, thereby preventing movement of snow located between the outer sphere and the inner sphere; said inner sphere further comprising two outer hemispheres joined to each other at their equators.

2. The device, as described in claim 1, wherein said hemispheres are removably attached to each other and said inner sphere is removably attached to said outer sphere.

3. The device, as described in claim 1, wherein at least a part of an outer surface of said outer sphere is flattened.

4. The device, as described in claim 1, further comprising a connector attached to said outer sphere.

5. The device, as described in claim 1, further comprising electric lighting mounted within at least one of said spheres.

6. The device, as described in claim 1, further comprising at least one mounting device adapted for connection of an accessory to said outer sphere, said mounting device disposed upon an outer surface of said outer sphere.

7. The device, as described in claim 6, further comprising an accessory attached to said mounting device.

8. The device, as described in claim 7, wherein said accessory is selected from the group comprising: arms, facial features, hats, clothing and pipes.

* * * * *